April 16, 1963 D. DIBNER 3,086,192

TAPERED PIN SOCKET

Filed May 2, 1960

INVENTOR.
DAVID DIBNER
BY [signature]
AGENT

United States Patent Office 3,086,192

Patented Apr. 16, 1963

3,086,192

TAPERED PIN SOCKET

David Dibner, Wilton, Conn., assignor to Burndy Corporation, a corporation of New York Filed May 2, 1960, Ser. No. 26,380
1 Claim. (Cl. 339—205)

This invention relates to electrical connectors, and more particularly to sockets for tapered pin connectors.

Tapered pins and sockets are a known means for conveniently making an electrical connection that has a high resistance to pull-out, and good electrical characteristics. The pins may be non-concurrently connected in multiple, as in a rack and panel connector. The pins and sockets are customarily fabricated of metal to substantially the same taper. When the pin is forcefully inserted, or impacted, into the socket a friction fit is obtained which provides a strong mechanical joint with good electrical connection characteristics.

The fabrication of a suitably tapered socket of metal, either as a solid metal unit, or as a sheet metal insert is relatively expensive, since individual machining or forming operations must be performed. It may be noted that in these prior art sockets, the inner wall surface of the tapered socket is the means for maintaining both the mechanical and electrical connection. Thus the socket must be made of material having a high electrical conductivity and must also be accurately fabricated to the correct taper.

It is, therefore, an object of this invention to provide an inexpensive tapered socket having excellent mechanical and electrical connection characteristics.

Another object of this invention is to provide a mounting scheme which is adapted to the "commoning" or mutual electrical interconnection of tapered pin socket connections.

A feature of this invention is a tapered pin socket comprising a mounting block which may be of dielectric material and is formed with a suitably tapered cavity to provide the mechanical connection; while a relatively high conductive insert disposed within the cavity provides the electrical connection.

These and other objects and features of this invention will become more apparent by reference to the following description taken in conjunction with the accompanying drawings, in which.

Figure 1:
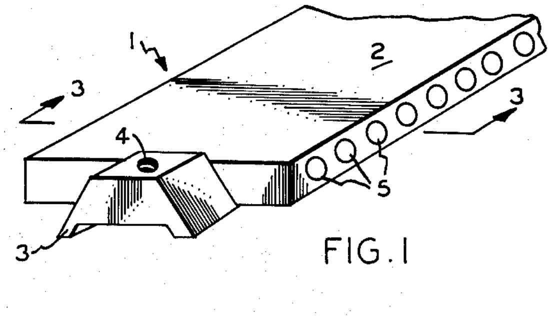
FIG. 1 is a perspective view of a portion of stackable multisocket unit according to the principles of this invention.

FIG. 1 illustrates a stackable base unit 1, which includes a body 2 of bar-like shape, an end lug 3 at each end of the bar, a bolt hole 4 in each lug, and a plurality of socket cavities 5 in the opposite edges of the bar.

Figure 2:
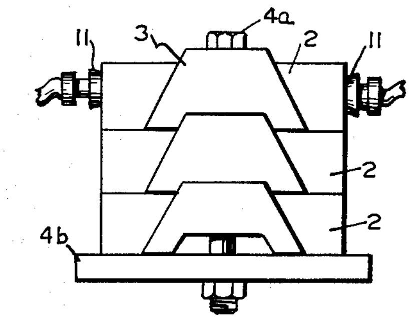
FIG. 2 is an end view of a plurality of stacked units as illustrated in FIG. 1.

As is shown in FIG. 2, the units may be stacked on top of each other, the lugs 3 being adapted to align the stack. A bolt 4*a* may be fitted through holes 4 in the lugs to secure the stack to a base-plate 4*b*. Tapered pins may be force fitted, or impacted into any of the cavities 5.

Figure 3:
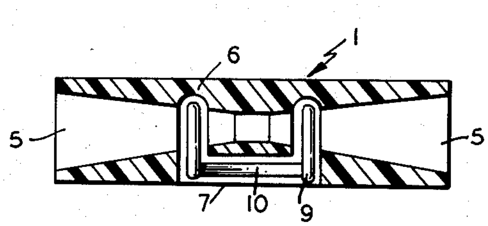
FIG. 3 is an end view in cross-section along line 3—3 of FIG. 1 of the unit of FIG. 1, illustrating the inserted wire contact embodying this invention.

As will be seen in FIG. 3, the cavities 5 may be arranged in axial pairs, each cavity being substantially cone shaped, and having a taper equal to that of the tapered pins 11. Each cone-shaped cavity 5 includes a circumferential groove 6, and the groove pairs 6 are interconnected by a channel 7.

Figure 4:
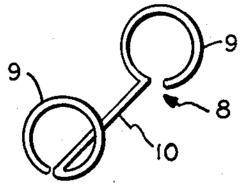
FIG. 4 is a perspective view of a wire contact embodying this invention.

A spring wire contact 8, shown in FIG. 4, which has a loop 9 at each end, and a connecting arm 10 therebetween, may be inserted in the units 1. Loops 9 fit in circumferential grooves 6, while the connecting arm 10 fits in channel 7. It will be noted that the inside diameter of the loop 9 is smaller than the diameter of the adjacent portion of the cavity 5. When a tapered pin 11 is impacted into cavity 5, it will have a friction fit therein, making mechanical contact with the entire juxtaposed inner wall of the cavity, and will be locked therein. The tapered pin will concurrently be inserted through the loop 9, and will expand the loop to make good electrical contact therewith. Grooves 6 are made deep enough to accommodate the loops 9 when they are expanded by an inserted tapered pin 11.

If it is desired to provide an increased area of contact between the wire contact 8 and the tapered pin 11, a shallow, arcuate groove 14 may be formed in pin 11. The depth of the groove 14 should not be so great as to prevent this pin 11 from expanding the loop to make good electrical contact therewith. Obviously, the cross-section of the wire of contact 8 may be other than circular, to also provide greater contact area.

The base units 1 may be conveniently molded out of plastic with the cavities 5 complete. Contacts 8 may be fabricated out of spring wire.

Figure 5:
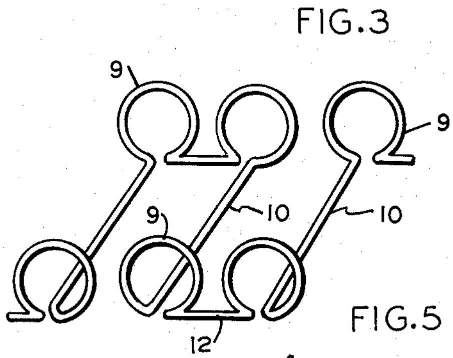
FIG. 5 is a perspective view of a continuous wire multi-contact embodying this invention.
Figure 7:
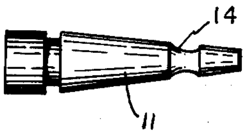
FIG. 7 is a plan view of a tapered pin adapted for use with this invention.

If it is desired to interconnect adjacent cavities, the specific contacts 8 may be formed with a connecting link 12 between loops 9, as shown in FIG. 5. A suitable channel 13, to accommodate link 12 may be provided in the body 2.

Figure 6:
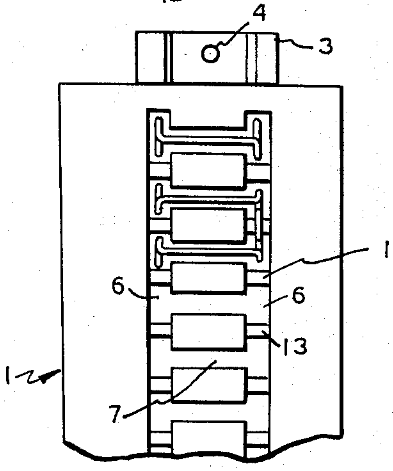
FIG. 6 is a bottom view of a portion of the unit shown in FIG. 1 illustrating, inter alia, the "commoning" or mutual electrical interconnection of the wire contacts according to the principles of this invention.

In use, the contacts may be inserted through the bottom of the body 2, as shown in FIG. 6. The contacts may be retained in place by suitable means, such as heat staking, which is the application of local heat to the bottom of base 2, adjacent the channel 7, to slightly deform the plastic and form a projection of plastic over the channel 7. Alternatively, the contacts may be simply held in place by the bottom plate 4*b*. Obviously the contacts 8 might be formed with projection to be accommodated by mating recesses in the grooves or channels, to affect a snap-in retention of the contacts.

If it is desired to common or electrically interconnect all the sockets 5 in each block 2, then the block may also be made of non-dielectric material, such as an inexpensive metal having relatively low conductivity, and the blocks 2 may be insulated from each other by suitable means, such as a strip of plastic.

The invention has thus been described but it is desired to be understood that it is not confined to the particular forms or usages shown and described. The same being merely illustrative, and that the invention may be carried out in other ways without departing from the spirit of the invention, and therefore, the right is broadly claimed to employ all equivalent instrumentalities coming within the scope of the appended claim, and by means of which objects of this invention are attained and new results accomplished, as it is obvious that the particular embodiments herein shown and described are only some of the many that can be employed to obtain these objects and accomplish these results.

I claim:

An electrical connection comprising an insertable and removable tapered electrical contact pin, an integral dielectric body, a first and second tapered cavity in said body, in small end to small end relationship, each of said tapered cavities including a recess in its inner wall, a tapered pin disposed in each of said tapered cavities and in direct mechanical connection with the inner walls of said tapered cavities, an insertable and removable electrical contact element resiliently disposed in each of said tapered cavities partially within the recess and partially within the tapered cavity and in direct electrical connection with said tapered pin and a channel in said dielectric body interconnecting said recesses in said end to end related cavities, and a conductive link disposed in said channel and electrically connecting said conductive elements.

References Cited in the file of this patent

UNITED STATES PATENTS

| | | |
|---|---|---|
| 941,276 | Russell | Nov. 23, 1909 |
| 2,158,003 | Douglas | May 9, 1939 |
| 2,866,958 | Postell | Dec. 30, 1958 |
| 2,903,671 | Dreher et al. | Sept. 8, 1959 |
| 2,904,768 | Rasmussen | Sept. 15, 1959 |
| 2,972,125 | Temple et al. | Feb. 14, 1961 |